United States Patent
Turk et al.

(10) Patent No.: US 7,923,410 B2
(45) Date of Patent: Apr. 12, 2011

(54) REGENERABLE SORBENTS FOR REMOVAL OF SULFUR FROM HYDROCARBONS AND PROCESSES FOR THEIR PREPARATION AND USE

(75) Inventors: Brian S. Turk, Durham, NC (US); Santosh K. Gangwal, Cary, NC (US); Raghubir P. Gupta, Durham, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 407 days.

(21) Appl. No.: 12/088,161

(22) PCT Filed: Sep. 27, 2006

(86) PCT No.: PCT/US2006/037460
§ 371 (c)(1),
(2), (4) Date: Mar. 26, 2008

(87) PCT Pub. No.: WO2007/038500
PCT Pub. Date: Apr. 5, 2007

(65) Prior Publication Data
US 2008/0251423 A1    Oct. 16, 2008

Related U.S. Application Data

(60) Provisional application No. 60/720,491, filed on Sep. 27, 2005.

(51) Int. Cl.
*C10G 25/12* (2006.01)
(52) U.S. Cl. ..... 502/415; 502/406; 502/439; 208/208 R; 208/244; 208/247; 208/248
(58) Field of Classification Search .............. 208/208 R, 208/244, 247–248; 502/406, 415, 439
See application file for complete search history.

(56) References Cited

U.S. PATENT DOCUMENTS

| | | | | |
|---|---|---|---|---|
| 5,174,919 A | * | 12/1992 | Cymbaluk et al. | 252/185 |
| 5,726,117 A | * | 3/1998 | Khare et al. | 502/400 |
| 5,972,835 A | | 10/1999 | Gupta | |
| 2005/0098478 A1 | | 5/2005 | Gupta et al. | |

FOREIGN PATENT DOCUMENTS

WO    WO 03/086621 A1    10/2003

OTHER PUBLICATIONS

Emmett, P.H. (1954). Catalysis, vol. 1, Reinhold, 394 pages.*
J. A. Toledo, et al., "Oxidative Dehydrogenation of 1-Butene to Butadiene on $\alpha$-$Fe_2O_3$/$ZnAl_2O_4$ and $ZnFe_xAl_{2-x}O_4$ Catalysts", Catalysis Letters, vol. 30, No. 1-4, XP002524585, 1995, pp. 279-288.
Gerhard Lagaly, et al., "Silicates", Ullmann's Encyclopedia of Industrial Chemistry, XP002524584, Jun. 15, 2000, pp. 43-45.

* cited by examiner

*Primary Examiner* — Robert J Hill, Jr.
*Assistant Examiner* — Brian McCaig
(74) *Attorney, Agent, or Firm* — Oblon, Spivak, McClelland, Maier & Neustadt, L.L.P.

(57) ABSTRACT

A sorbent for use in removing sulfur contaminants from hydrocarbon feedstocks is provided, wherein the sorbent contains zinc aluminate in an amount of at least 40 wt % (calculated as $ZnAl_2O_4$); free alumina in an amount of from about 5 wt % to about 25 wt % (calculated as $Al_2O_3$); and iron oxide in an amount of from about 10 wt % to about 30 wt % (calculated as $Fe_2O_3$); wherein each of the free alumina and iron oxide are present in non-crystalline form as determined by X-ray diffraction analysis, and a method for producing the sorbent and method for using the sorbent to reduce sulfur contaminants in hydrocarbon feedstocks.

22 Claims, No Drawings

REGENERABLE SORBENTS FOR REMOVAL OF SULFUR FROM HYDROCARBONS AND PROCESSES FOR THEIR PREPARATION AND USE

FIELD OF THE INVENTION

The present invention relates to sorbents for the desulfurization of hydrocarbons, particularly hydrocarbon fuels and hydrocarbon fuel components and their precursors. More particularly, the present invention relates to sorbents capable of removing cyclic and polycyclic sulfur compounds such as benzothiophenes, dibenzothiophenes, and polybenzothiophenes, and/or other organic sulfur contaminants including organic sulfides, disulfides, mercaptans, thiophenes, and the like, from hydrocarbon fuels such as gasoline, diesel fuels, aviation fuels, and from components and precursors of such fuels such as FCC naphtha, i.e., naphtha from a fluid catalytic cracker (FCC), FCC light cycle oil, coker distillate, and the like.

BACKGROUND OF THE INVENTION

International Patent Publication WO02/22763 A1, published Mar. 21, 2002, (assigned to RESEARCH TRIANGLE INSTITUTE) describes sulfur removal sorbents and processes for their preparation and use. The sulfur removal technology and sorbents of WO02/22763 A1 disclose the treatment of hydrocarbon fuels, particularly diesel and gasoline fuels, to reduce sulfur contaminants to less than about 30 parts per million by weight (ppmw), for example, to 15 ppmw or less. In particular, a normally liquid hydrocarbon fuel or fuel component, such as an FCC naphtha, FCC light cycle oil, coker distillate, straight run diesel fraction, or the like, is treated at an elevated temperature, preferably a temperature above about 300° C. (572° F.), with a sorbent comprising an active metal oxide sulfur sorbent, such as a zinc oxide, iron oxide, zinc titanate or the like, in the absence of an active hydrodesulfurization (HDS) catalyst, to reduce sulfur contaminant levels to less than about 30 ppmw, sulfur. The sorbents preferably include a refractory inorganic oxide cracking catalyst support such as alumina, an aluminosilicate or the like, in combination with the metal oxide sulfur sorbent. Metal-substituted inorganic oxide cracking catalyst support such as metal aluminates, e.g., zinc aluminate, iron aluminate, are among the preferred supports.

The desulfurization technology of Patent Publication WO02/22763 A1 can achieve substantial reductions of cyclic and polycylic organic sulfur contaminants in various feedstocks such as hydrotreated FCC naphtha and hydrotreated diesel blends and components to reduce their sulfur content to below 30 ppmw, or less, while avoiding or minimizing the problems traditionally associated with cyclic sulfur contaminant removal. Such traditional problems have included high hydrogen consumption associated with olefin and aromatic saturation, product yield losses and/or increased processing costs associated with HDS processes. In one embodiment, the sorbents and desulfurization processes of Patent Publication WO02/22763 A1 are employed in a polishing step for removal of sulfur contaminants, particularly cyclic and polycylic organic sulfur contaminants, from relatively low-sulfur feedstocks including low-sulfur hydrocarbon fuels, fuel components or fuel precursor feeds.

Regeneration of the sorbents is achieved by contacting the sorbent with an oxygen-containing gas, preferably air, at a temperature sufficient to cause the sulfur present on the sorbent to react with oxygen to form sulfur dioxide. Typically, the equilibrium temperatures in the regeneration zone exceed a temperature of about 425° C. (800° F.).

The entire disclosure of the aforesaid International Patent Publication WO02/22763 A1 is hereby incorporated herein.

SUMMARY OF THE INVENTION

The present invention provides sulfur sorbents which can be used to remove sulfur contaminants, particularly cyclic and polycylic organic sulfur contaminants, from hydrocarbon feedstocks such as hydrotreated FCC naphtha and hydrotreated diesel blends and components. The sorbents of the invention have high reactivity and high surface area, and can be prepared in pelletized form in fixed bed reactors. Advantageously the sorbents are used to perform the final sulfur removal step in the production of diesel fuels.

The sulfur sorbents of the invention comprise zinc aluminate (calculated as $ZnAl_2O_4$) in an amount of at least about 40 wt. %, preferably at least about 50 wt. %, more preferably from about 60 wt. % to about 70 wt. %, free alumina (calculated as $Al_2O_3$) in an amount ranging from about 5 wt. % to about 25 wt. %, preferably from about 10 to about 20 wt. %, and iron oxide (calculated as $Fe_2O_3$) in an amount ranging from about 10 wt. % to about 30 wt. %, preferably from about 15 to about 25 wt. %. The iron oxide is present in non-crystalline form (i.e., no crystalline iron oxide phase is detected by conventional X-Ray Diffraction (XRD) analysis). Similarly, the free alumina (i.e., aluminum oxide that is not reacted with zinc) is also present in non-crystalline form, (i.e., no crystalline aluminum oxide phase is detected by conventional XRD analysis). Although currently not preferred, the sorbent compositions of the invention can optionally include promoter components and chemically inert components (the latter including components that may exhibit measurable but only minimal chemical activity), in amounts of up to 20 wt %, based on the total weight of the sorbent, preferably less than 10 wt %, more preferably less than 5 wt % of the total sorbent weight. Sorbent compositions which are substantially free of such promoters and/or inert components such as binders or the like are currently preferred in the practice of the invention.

The sorbents of the present invention are advantageously prepared from a mixture of precipitated precursors of zinc oxide, iron oxide and aluminum oxide, such precursors being known in the art. The zinc aluminate, iron oxide and free alumina components of the sorbent are formed when the precursors are heated in an oxidizing environment. Currently preferred precipitated precursors of zinc oxide, iron oxide, and aluminum oxide, respectively, are $Zn(NO_3)_2$, $Fe(NO_3)_3 \cdot 9H_2O$, and $Al(NO_3)_3$. The aluminum oxide precursor is present in a molar amount exceeding the zinc oxide to thereby provide free alumina in the final sorbent. Advantageously, the precursor mixture is initially formed as a wet filtered cake recovered directly from a precipitation step or steps. Preferably, the precipitated precursors in the precursor mixture are simultaneously formed in a single co-precipitation step. The filter cake is preferably pre-dried in one or a plurality of heating steps, preferably in an oxidizing atmosphere, e.g., air, at sufficiently high temperatures to convert the precursors to their oxides. The dried filter cake is remoistened to form a paste, preferably after a grinding step, and then formed into pellets, preferably by extrusion. Preferably nitric acid is added to the paste in a small amount sufficient to improve the flow properties of the paste, prior to extrusion of the paste. The pellets are heated to a temperature of at least about 550° C., preferably above about 650° C. to form the final sorbent.

The sorbents of the invention differ in several aspects from those disclosed in Patent Publication WO02/22763 A1. The iron oxide component of the prior sorbents was deposited onto a refractory support and, following the calcination step, was present as a crystalline phase. The iron oxide component of the current sorbents is not present in crystalline form, although the reasons for this are not currently fully understood. The non-crystalline nature of the iron oxide is believed to result, at least in part, from the process used to form the current sorbents, i.e., from the exceedingly small sizes of the precursors in the precipitated precursor mixture, and from the simultaneous conversion of the precursors into the metal oxide components of the sorbent. The non-crystalline nature of the iron oxide may also be due in part to an interaction between the iron oxide and the free alumina in the final sorbent. The sorbents of the invention have an exceedingly high surface area, typically above about 50 square meters per gram ($m^2/g$, measured as BET surface area as will be appreciated by the skilled artisan), preferably above about 80 $m^2/g$, more preferably above about 100 $m^2/g$, and also have acceptable crush strength.

In the prior sorbents, alumina, when used, was present as a crystalline phase. In the present sorbents, the free alumina is not present as a crystalline phase. It is also noteworthy that the free alumina in the current sorbents provides a significant benefit in the manufacturing process. In particular, the "precipitated precursor" process initially forms extremely fine precipitates which are preferably dried prior to conversion into pellets. However when the precipitate contents of zinc oxide and aluminum oxide precursors are present in equal molar quantities, (in combination with the iron oxide precursor), it was found that it was extremely difficult to remove moisture from the filter cake prior to drying. The presence of free alumina, due to an unknown interaction with either the zinc oxide or iron oxide precursor, or both, provides a filter cake that releases water much more readily.

DESCRIPTION OF THE PREFERRED EMBODIMENT

In the foregoing description, and in the following detailed description, preferred embodiments of the invention are described to enable practice of the invention. Although specific terms are used to describe and illustrate the preferred embodiments, such terms are not intended as limitations on practice of the invention. Moreover, although the invention is described with reference to the preferred embodiments, numerous variations and modifications of the invention will be apparent to those of skill in the art upon consideration of the foregoing, together with the following detailed description.

The quantities of zinc aluminate, iron oxide and free alumina in sorbents of the invention can be determined by calculations based on the starting materials, as will be apparent to the skilled artisan. Alternatively, the quantities of zinc aluminate, iron oxide and free alumina can be determined from quantitative analytical procedures to measure the zinc, aluminum, and iron metal contents of the sorbents as will also be apparent to the skilled artisan. In either case, weight percent calculations are determined wherein the zinc aluminate is calculated as $ZnAl_2O_4$, the iron oxide is calculated as $Fe_2O_3$, and the free alumina is calculated as $Al_2O_3$. The term, "substantially free", is used herein to mean a weight percent of 1 percent or less.

Detection of crystalline phases in the sorbent are determined by x-ray diffraction procedures. X-ray diffraction procedures also allow determination of "crystallite size" using x-ray diffraction line broadening analysis of the most intense peak for the crystalline phases, if present. The qualitative data for this analysis are collected using Cu Kα X-rays generated at 45 kV and 40 mA on a Shimadzu model XRD-6000 outfitted with a 1° divergence slit, a 0.3 mm receiving slit, and a diffracted beam monochromator, or the equivalent.

Samples are inspected to ensure that the particles or agglomerations of particles are between 40 and 70 microns. Samples, that do not meet these specifications, are ground using a mortar and pestle with moderate hand pressure for no more than one minute to reduce and homogenize particle size. Samples are loaded into an XRD sample holder and the material is packed into the holder as tightly as possible with hand pressure using a glass slide to ensure that a flat surface is attained, which is on the same plane as the surface of the sample holder.

The XRD pattern is measured with a Shimadzu XRD-6000. This instrument uses a copper source stimulated with 45 kV and 40 mA to generate Cu Kα X-rays with a maximum output of 2 kW. These x-rays pass through a 1° divergence slit. The sample is scanned from 8 to 62 degrees 2θ. The scan rate is 0.02 degrees per 2 seconds. A 3 mm receiving slit and diffracted beam monochromator process the radiation prior to a sodium iodide scintillation counter, which measures counts per second. The operation and data collection of the Shimadzu 6000 is controlled by Shimadzu XRD-6000 V4.1 software.

The raw data generated by the Shimadzu XRD-6000 V4.1 software is reformatted by a python language program as suitable input for software for interpreting and analyzing the XRD diffraction patterns. The interpretation software is Jade 3.1. One of the values that is calculated by the Jade software is crystallite size. The crystallite size is calculated according to the formula:

$$\text{Size(Angstroms)} = \{0.9 \times W/[FWHM - (GW)^2]^{1/2}\}/\cos\theta$$

where W, the X-ray wavelength for the Cu source, is 1.540562 angstroms, FWHM is the reported peak width at half maximum in radians as determined by the software, GW is the inherent broadening factor for this instrument and theta is half the reported peak centroid. The final reported crystallite size for each crystalline phase is the crystallite size calculated by the Jade software for the most intense peaks.

Returning now to the sorbents and processes of the invention, it will be appreciated to those of skill in the art, that although in the currently preferred embodiments of the invention, the sorbents are prepared in the form of pelletized, fixed bed sorbents, the sorbents alternatively can be provided in a fluidizable form for use in various fluidized reactors and processes. In such cases, the filter cake of precursors is preferably converted into a slurry, spray dried, and calcined, as will be apparent to those of skill in the art.

As indicated previously the sorbents of the invention can be used to remove sulfur contaminants, particularly cyclic and polycylic organic sulfur contaminants, from various hydrocarbon feed stocks such as hydrotreated FCC naphtha and hydrotreated diesel blends and the like to provide a final product having a sulfur content of 15 ppmw or less, preferably 10 ppmw or less. In one preferred process, the sorbents of the invention are used to remove cyclic and polycyclic sulfur contaminants from a hydrodesulfurization (HDS) effluent, which contains $H_2S$ formed during the HDS process. In this regard, it is noteworthy that preferred sorbents of the invention are capable of removing cyclic and polycyclic sulfur compounds in presence of $H_2S$ and mercaptans.

According to one particularly preferred process embodiment, the sorbents of the invention are used to treat a desulfurized diesel feed stream which is received directly from a conventional HDS diesel fuel treating process. The HDS diesel effluent, which contains gaseous $H_2S$ and organic sulfur contaminants, is preferably passed into a conventional fixed bed apparatus containing sorbents of the invention in pelletized form, at a temperature of from about 600° F. to 800° F. (315° C. to 425° C.), preferably about 700° F. (370° C.). In general the HDS diesel effluent stream will have a sulfur exceeding regulatory requirements for the sulfur content in diesel fuels, for example, a sulfur content above 10 ppmw. Typically the HDS diesel effluent stream fed to the fixed bed reactor has an organic sulfur contaminant content exceeding 100 ppmw, more typically exceeding 300 ppmw, even more typically, an organic sulfur content of from 500 to 1000 ppmw. Typically the organic sulfur contaminant content is composed predominantly of cyclic and polycyclic organic sulfur contaminants, i.e., at least about 90 wt. % of the total organic sulfur contaminant content is composed of cyclic and polycyclic organic contaminants. Preferably, hydrogen is mixed with the HDS diesel effluent which is fed to the fixed bed reactor containing the sorbent.

Preferably the quantity of hydrogen mixed with the HDS diesel feed stream is an amount of at least about 1000 standard cubic feet per barrel (scf/bbl) or greater, preferably in an amount of from about 2000 to about 4000 scf/bbl. The hydrogen prevents or minimizes coking of the sorbent which typically results from high temperature hydrocarbon processing. The consumption of hydrogen is accordingly relatively low. Unreacted hydrogen can be recovered by conventional separation processes from the desulfurized diesel which has been contacted with the sorbents of the invention. The separated hydrogen can then be recycled for mixing with the HDS diesel effluent which is fed to the fixed bed reactor containing the sorbent of the invention, and/or for mixing with the feed to the diesel HDS unit. Following treatment with the sorbents of the invention, the effluent stream is also preferably treated by conventional means for removal of various contaminants, such as light gaseous hydrocarbons, e.g., methane, ethane, propane, etc., and/or $H_2S$ and the like.

A final diesel product is produced according to this preferred embodiment of the invention, which has an organic sulfur content of 15 ppmw or less, preferably 10 ppmw or less. The fixed bed containing the sorbents of the invention is periodically disconnected from the hydrocarbon feedstream and treated for regeneration by contacting the sorbent with an oxygen containing gas, typically air, at a temperature of from about 800° F. to about 1200° F. (about 425° C. to about 650° C.), preferably at a temperature of about 800° F. to about 900° F. (about 425° C. to about 480° C.).

The following examples illustrate preferred sorbents of the invention and the preferred process for preparing them.

Example 1

Preparation of Sorbents

This example demonstrates preparation of fixed bed sorbents having the composition; 65 wt % $ZnAl_2O_4$, 20 wt. % $Fe_2O_3$, and 15 wt % $Al_2O_3$. The sorbents are prepared by the co-precipitation method under a constant pH of 6±0.2 using a mixture of aqueous solutions of zinc (II) nitrate, aluminum (III) nitrate and iron (III) nitrate as metal precursors and aqueous $NH_3$ as a precipitating agent. The concentrations of Zn, Al and Fe in their nitrate solutions are 16.6, 4.3 and 7.0%, respectively. For the preparation of 75 lb of the final oxide mixture, 104 lb of zinc nitrate solution, 471 lb of aluminum nitrate solution, and 150 lb of iron nitrate solution are mixed in tank-1. In another tank (tank-2), 245 lb of 29% ammonia was mixed with 245 lb of de-ionized (DI) water. The contents in tank-1 and tank-2 are pumped and mixed in a tank-3 at room temperature under vigorous stirring using an agitator. The flow rate of the mixed metal solutions in tank-1 is set at 10-15 lb/min. while adjusting the flow rate of $NH_3$ solution in order to maintain the pH of the precipitate to 6±0.2. The precipitate is aged at room temperature for about 30 min. and then filtered using a filter press. The cake is air blown for 15 min after filtration, dropped into a re-slurry tank, mixed with DI water to re-slurry the wet cake and the filtration is repeated to reduce residual ammonia. The cake is then pre-dried in a muffle furnace at 220° C. (428° F.) for 2 hours.

Extrudates of fixed bed diesel desulfurization sorbents are prepared using this cake by grinding and mixing with an appropriate amount of DI water and $HNO_3$ as a binder and extruding the paste. Typically, 2060 g of the cake is used as is or pre-dried at 370° C. The cake is then ground to powder in a mechanical mixer. To this powder, 932.1 g of DI water containing 45.1 g of concentrated $HNO_3$ is added dropwise to achieve a moisture content of around 36 wt % while grinding the powder. The paste is then extruded on a 2.25 inch Bonnet extruder using both a 1/16 inch as well as a 1/8 inch die. All extrudates are calcined at 650° C. for 2 h at a ramp rate of 3° C./min. This procedure is used to prepare a number of distinct samples by varying the amount of DI water and concentrated $HNO_3$ as well as extrusion size used. Table 1 summarizes the amount of DI water and concentrated $HNO_3$ used for the preparation of a series of extrudates while their physical properties are shown in Table 2. XRD analysis showed only a zinc aluminate crystalline phase, with a crystallite size of 95 Å to 105 Å. Free zinc oxide, iron oxide, or aluminum oxide crystalline phases were not detected. In addition, iron aluminate could not be detected.

TABLE 1

Summary of Sorbent Preparations

| Sample code | Pre-calc. Temp. (° C.) | Wt of Solid (g) | Wt of DI water (g) | Wt of $HNO_3$ (g) | Moisture content (wt %) | $HNO_3$ content (wt %) | Extrusion size (inch) |
|---|---|---|---|---|---|---|---|
| 022105a-DDS | 220 | 2000 | 464 | 37 | 42.62 | 1.03 | 1/16 |
| 022505a-DDS | 370 | 2300 | 1024 | 51.6 | 36.84 | 1.06 | 1/8 |
| 022805a-DDS | 370 | 1900 | 843.1 | 42.5 | 36.77 | 1.06 | 1/8 |
| 022805b-DDS | 370 | 1900 | 843.1 | 42.5 | 36.77 | 1.06 | 1/16 |
| 031805a-DDS | 370 | 2060 | 887 | 45.1 | 36.20 | 1.05 | 1/16 |

TABLE 2

Physical Properties of Sorbents

| Sample code | CBD# (g/cc) | CS$ (lbs. force) | BET SA ($m^2$/g) | Porosity* (%) | Av. Pore dia (Å)* |
|---|---|---|---|---|---|
| 022105a-DDS | 0.76 | 3.28 | 92 | 44.4 | 84 |
| 022505a-DDS | 0.88 | 22.83 | 99 | 47.4 | 89 |
| 022805a-DDS | 0.82 | 12.11 | 106 | 46.8 | 82 |
| 022805b-DDS | 0.77 | 6.83 | 108 | 48.6 | 84 |
| 031805a-DDS | 0.89 | — | 87.6 | 54.1 | 117 |

Compact bulk density
$CS = Crush strength
*Determined by Hg porosimetry

Example 2

Desulfurization of Hydrotreated Diesel, with Sorbent of Example 1

Approximately 237.2 g of the extruded sorbent sample from batch 022105a-DDS of Example 1 was loaded in a bench-scale reactor system. This sample was initially tested in eight alternating desulfurization and regeneration cycles. In each of the desulfurization cycles, the sample was exposed to a vapor mixture of hydrogen and hydrotreated diesel containing 4400 scf of hydrogen per bbl of hydrotreated diesel at 700° F. and 30 psig for 2 hours. In the regeneration cycles, the sample was contacted with a mixture of 2 vol % $O_2$ in $N_2$ at 700° F. and 30 psig until the $CO_2$ concentration in the effluent was <500 ppmv. During the desulphurization cycles, the sulfur in the hydrotreated diesel feed was 148 ppmw, whereas the sulfur in the effluent product was consistently below 50 ppmw for a majority of the 2 hour exposure period. The sorbent was then tested for three additional desulfurization cycles during which 900 ppmv of $H_2S$ was added to the hydrogen and hydrotreated diesel mixture fed to the sorbent. The sorbent successfully reduced the sulfur in the hydrotreated diesel feed from 148 ppmw to less than 50 ppmw for most of each of the 2 hour exposure periods despite the $H_2S$ gas in the feed.

Example 3

Desulfurization of Hydrotreated Diesel with Sorbent of Example 1

A 237.2 g sample of the 022105a-DDS sorbent sample prepared in Example 1 was loaded in a bench-scale reactor system. The sorbent was initially conditioned for 12 alternating desulfurization and regeneration cycles. In the initial desulfurization cycles, the sorbent was contacted with a mixture of hydrogen and hydrotreated diesel vapor containing 4400 scf of hydrogen/bbl of hydrotreated diesel at 700° F. and 30 psig for 2 hours. In the initial regeneration cycles, the sorbent was contacted with a mixture of 2 vol % $O_2$ in $N_2$ until the $CO_2$ effluent concentration dropped below 500 ppmv. Subsequent desulfurization and regeneration cycles were then conducted under the same conditions except that the ratio of hydrogen to hydrotreated diesel vapor in the feed was varied. The effluent product was analyzed for sulfur using an ANTEK 9000 series total sulfur analyzer and ASTM D 1319 for aromatic content. The results from this parametric testing are provided in Table 3.

TABLE 3

Analysis of Aromatic Content of Product Samples during Parametric Testing

| | | Hydrogen to diesel ratio (scf/bbl) | | |
|---|---|---|---|---|
| | Diesel feed | 1132 | 4392 | 12984 |
| Aromatics (LV %) | 35.6 | 36.1 | 35.3 | 33.4 |
| Olefins (LV %) | 1.3 | 1.7 | 1.6 | 2.2 |
| Saturates (LV %) | 63.1 | 62.2 | 63.1 | 64.4 |
| Avg S Conc. (ppmw) | 148 | 90 | 40 | 15 |

As will be apparent to the skilled artisan, the various operating parameters of pressure, temperature, residence time, hydrogen to hydrocarbon ratio, etc., can be optimized to obtain a final sulfur content of or below 10 ppmw.

The present application is based on and claims priority to U.S. Provisional application Ser. No. 60/721,491, filed Sep. 27, 2006, the entire contents of which are hereby incorporated by reference.

The invention claimed is:

1. A method of producing a sorbent, comprising:
   heating under oxidizing conditions precipitated precursors of zinc oxide, aluminum oxide and iron oxide, wherein said precipitated precursors of zinc oxide, iron oxide, and aluminum oxide are $Zn(NO_3)_2$, $Fe(NO_3)_3.9H_2O$, and $Al(NO_3)_3$, respectively, wherein the precursor for aluminum oxide is present in a molar excess sufficient to react with substantially all of the precursor of zinc oxide and to produce free alumina, and wherein said precipitated precursors of zinc oxide and iron oxide are present in amounts sufficient that said sorbent has a composition comprising;
   a) zinc aluminate in an amount of at least about 40 wt % (calculated as $ZnAl_2O_4$);
   b) free alumina in an amount of from about 5 wt % to about 25 wt % (calculated as $Al_2O_3$); and
   c) iron oxide in an amount of from about 10 wt % to about 30 wt % (calculated as $Fe_2O_3$).

2. The method of claim 1, wherein said heating is at a temperature of at least 550° C.

3. The method of claim 2, wherein said heating is at a temperature of at least 650° C.

4. The method of claim 1, wherein said sorbent is in a pelletized form.

5. The method of claim 4, wherein said pelletized form is obtained by extrusion of a wet paste formed from said precipitated precursors.

6. The method of claim 5, wherein said wet paste is obtained by wetting a dried filter cake of said precipitated precursors with sufficient liquid to improve flow properties of the paste.

7. The method of claim 6, wherein said wetting is performed with nitric acid.

8. A method of reducing sulfur contaminants in a hydrocarbon feedstock, comprising:
   contacting a hydrocarbon feedstock containing one or more cyclic or polycyclic organic sulfur contaminants, with a sorbent produced by the method of claim 1 in a reactor at a temperature of from about 600° F. to about 800° F. under a reducing atmosphere; and
   recovering a reduced sulfur hydrocarbon feedstock having a sulfur content of about 15 ppmw or less.

9. The method of claim 8, wherein said one or more cyclic or polycyclic organic sulfur contaminants are present in said hydrocarbon feedstock in a total amount of at least 100 ppmw.

10. The method of claim 8, wherein at least about 90 wt. % of total organic sulfur contaminant content is composed of cyclic and polycyclic organic contaminants.

11. The method of claim 8, wherein said hydrocarbon feedstock is an hydrodesulfurization (HDS) effluent.

12. The method of claim 11, wherein said hydrodesulfurization (HDS) effluent comprises $H_2S$ formed during an hydrodesulfurization (HDS) process.

13. The method of claim 12, wherein said hydrodesulfurization (HDS) effluent comprises $H_2S$ in an amount up to about 900 ppmw.

14. The method of claim 8, wherein said sorbent is in a pelletized form.

15. The method of claim 8, wherein said reducing atmosphere is provided by addition of hydrogen gas to said hydrocarbon feedstock being fed to the reactor.

16. The method of claim 15, wherein said hydrogen gas is added in an amount of at least 1000 scf/bbl of hydrocarbon feedstock.

17. The method of claim 8, wherein said contacting is conducted in a fixed-bed reactor.

18. The method of claim 8, wherein on a periodic basis, the sorbent is regenerated by contacting the sorbent with an oxygen containing gas at a temperature of from about 800° F. to about 1200° F.

19. The method of claim 18, wherein said oxygen containing gas is air.

20. A method of producing a sorbent, comprising:
heating under oxidizing conditions precipitated precursors of zinc oxide, aluminum oxide and iron oxide, wherein the precursor for aluminum oxide is present in a molar excess sufficient to react with substantially all of the precursor of zinc oxide and to produce free alumina, and wherein said precipitated precursors of zinc oxide and iron oxide are present in amounts sufficient that said sorbent has a composition comprising;
a) zinc aluminate in an amount of at least about 40 wt % (calculated as $ZnAl_2O_4$);
b) free alumina in an amount of from about 5 wt % to about 25 wt % (calculated as $Al_2O_3$); and
c) iron oxide in an amount of from about 10 wt % to about 30 wt % (calculated as $Fe_2O_3$);
wherein said sorbent is in a pelletized form obtained by extrusion of a wet paste formed from said precipitated precursors, wherein said wet paste is obtained by wetting a dried filter cake of said precipitated precursors with sufficient nitric acid to improve flow properties of the paste.

21. The method of claim 20, wherein said heating is at a temperature of at least 550° C.

22. The method of claim 21, wherein said heating is at a temperature of at least 650° C.

* * * * *